(12) United States Patent
Yoshioka

(10) Patent No.: US 12,321,742 B2
(45) Date of Patent: Jun. 3, 2025

(54) MONITORING APPARATUS, CONTROL METHOD FOR MONITORING APPARATUS, AND STORAGE MEDIUM

(71) Applicant: CANON KABUSHIKI KAISHA, Tokyo (JP)

(72) Inventor: Migaku Yoshioka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 168 days.

(21) Appl. No.: 18/186,703

(22) Filed: Mar. 20, 2023

(65) Prior Publication Data

US 2023/0315441 A1  Oct. 5, 2023

(30) Foreign Application Priority Data

Mar. 29, 2022 (JP) ................. 2022-054097

(51) Int. Cl.
  *G06F 8/71* (2018.01)
  *G06F 8/65* (2018.01)

(52) U.S. Cl.
  CPC . *G06F 8/71* (2013.01); *G06F 8/65* (2013.01)

(58) Field of Classification Search
  CPC .................... G06F 8/71; G06F 8/65
  See application file for complete search history.

(56) References Cited

U.S. PATENT DOCUMENTS

| | | | |
|---|---|---|---|
| 8,839,444 B2* | 9/2014 | Roshchin | G06F 21/105 726/26 |
| 9,971,588 B2 | 5/2018 | Tsuchiya et al. | |
| 2005/0102240 A1* | 5/2005 | Misra | G06Q 30/06 705/59 |
| 2007/0288389 A1* | 12/2007 | Vaughan | G06F 21/10 705/59 |
| 2008/0148253 A1* | 6/2008 | Badwe | G06F 21/1078 717/174 |
| 2016/0292397 A1* | 10/2016 | Allfrey | G06Q 30/018 |

FOREIGN PATENT DOCUMENTS

| | | | |
|---|---|---|---|
| JP | 2003150854 A | * | 5/2003 |
| JP | 2016162063 A | | 9/2016 |
| JP | 2018136876 A | | 8/2018 |

* cited by examiner

*Primary Examiner* — Phillip H Nguyen
(74) *Attorney, Agent, or Firm* — ROSSI, KIMMS & McDOWELL LLP

(57) ABSTRACT

A monitoring apparatus configured to monitor a network device that is a management target of a device management service, wherein software is executed that operates in different operation modes according to a usage format, compares a version of a license agreement related to the update and linked to the current usage format for the monitoring apparatus with the current version of the license agreement in the case in which an update related to the software is necessary, and in the case in which the versions are the same, performs the update related to the software.

9 Claims, 11 Drawing Sheets

FIG. 7

```
[
    {
        "region" : "eu",
        "appVersion" : "2.0",
        "eula" : [
            { "type" : "proxy", "eulaVersion" : "1.0" },
            { "type" : "polling", "eulaVersion" : "2.0" }
        ],
        "url" : "http://example1.com/update?id=exampleid&dest=eu",
        ...
    },
    {
        "region" : "jp",
        "appVersion" : "2.0",
        "eula" : [
            { "type" : "proxy", "eulaVersion" : "1.0" },
            { "type" : "polling", "eulaVersion" : "2.0" }
        ],
        "url" : " http://example1.com/update?id=exampleid&dest=jp",
        ...
    },
    ...
]
```

FIG. 11

```
[
  {
    "region" : "eu",
    "appVersion" : "2.0",
    "eula" : [
      { "type" : "proxy", "eulaVersion" : "1.0" },
      { "type" : "polling", "eulaVersion" : "2.0" }
    ],
    "url" : "http://example1.com/update?id=exampleid&dest=eu",
    "updatableLibrary" : [
      "example1.dll",
      "Data/example2.dll",
      ...
    ],
    ...
  },
  {
    "region" : "jp",
    "appVersion" : "2.0",
    "eula" : [
      { "type" : "proxy", "eulaVersion" : "1.0" },
      { "type" : "polling", "eulaVersion" : "2.0" }
    ],
    "url" : " http://example1.com/update?id=exampleid&dest=jp",
    "updatableLibrary" : [
      "example1.dll",
      "Data/example2.dll",
      ...
    ],
    ...
  },
  ...
]
```

MONITORING APPARATUS, CONTROL METHOD FOR MONITORING APPARATUS, AND STORAGE MEDIUM

BACKGROUND OF THE INVENTION

Field of the Invention

The present invention relates to a monitoring apparatus, a control method for a monitoring apparatus, and a program.

Description of Related Art

A device management system is known that performs management such as maintenance, and the like by collecting data from devices that are installed in offices or the like (for example, image forming apparatuses) via a network. By using the device management system, it is possible to, for example, search for and rapidly respond to damage that has occurred to a device, the necessity to resupply consumables, or the like via the network. As the configuration for the device management system, a configuration is known that comprises a management server that centrally manages each device, and an information processing device that functions as a monitoring apparatus (a management client) that collects operation information from a plurality of devices and transmits this to the management server. For example, the monitoring apparatus acquires data from the devices by using a method such as periodical polling, or the like. In addition, the monitoring apparatus also has a structure that manages the devices by using a proxy function. Japanese Unexamined Patent Application, First Publication No. 2018-136876 discloses a structure in which the proxy function of a monitoring apparatus is used in a device having a self-monitoring function that is able to collect the necessary operation information for a service within the device and transmit this to a management server.

A method in which a monitoring apparatus itself or an external information processing apparatus downloads and updates update data for the monitoring apparatus via a network is known as a software update method for a monitoring apparatus. Japanese Unexamined Patent Application, First Publication No. 2016-162063 discloses an information processing apparatus that periodically confirms with an update server having update data as to whether or not a new version of its software exists, and in the case in which a new version exists, acquires the latest update data from the update server, and automatically performs an update.

However, in the technology of Japanese Unexamined Patent Application, First Publication No. 2016-162063, updates for the monitoring apparatus are performed regardless of commands from the user, and therefore, in the case in which the contents of the end-user license agreement have changed in accordance with a functional change to the monitoring apparatus, it is not possible to perform automatic updates for the monitoring apparatus. In contrast, in the case in which the monitoring apparatus is not used in a usage format in which the functions are changed by the user updating the monitoring apparatus, agreeing to the EULA is not necessary. For example, there are cases in which there is a change to the EULA relating to the structure in which the monitoring apparatus acquires information from the devices and transmits this to the management server, and there is no change to the EULA concerning the structure that manages the monitoring apparatus by using a proxy function. In this case, users who use only the former functions do not need to agree to the EULA, and the provision of the proxy function may be made so as to continue by automatically updating the software without the user's agreement.

SUMMARY OF THE INVENTION

The present invention makes it possible to update software according to the usage type of a monitoring apparatus.

The monitoring apparatus of the present invention is a monitoring apparatus that monitors network devices that are management targets of a device management service, and executes a software that operates in different operational modes according to a usage format, the monitoring apparatus comprising: a memory storing instructions, and a processor executing the instructions causing the monitoring apparatus to: in the case in which an update in relation to the software is necessary, compare a version of the license agreement that is related to the update with a version of the current license agreement, which are linked to the current usage format of the monitoring apparatus, and in the case in which the version of the license agreement that is related to the update and is linked to the current usage format of the monitoring apparatus and the version of the current license agreement are the same, to execute an update related to the software.

Further features of the present invention will become apparent from the following description of exemplary embodiments with reference to the attached drawings.

BRIEF DESCRIPTION OF THE DRAWINGS

FIG. 7 is a diagram showing one example of an update settings file.

FIG. 11 is a diagram showing one example of an update settings file according to a third embodiment.

DETAILED DESCRIPTION OF THE INVENTION

First Embodiment

Figure 1:
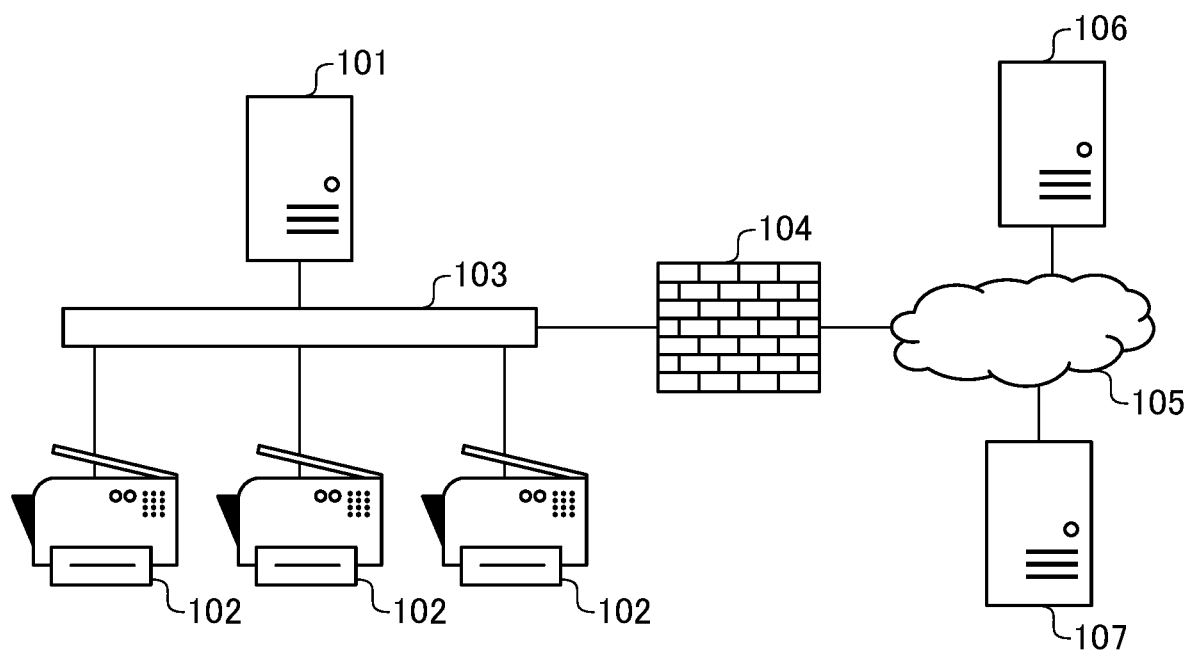
FIG. 1 is a diagram showing a configuration of a device management system.

FIG. 1 is a diagram showing a configuration of a device management system. The device management system is a system for managing network devices (referred to below as "device(s)"). The device management system includes a device 102, which is a management target, a monitoring apparatus 101 that collects data from the device, and a management server 106 that provides a device management service that manages the data collected by the monitoring apparatus. The monitoring apparatus 101 and the one or more devices 102 are located inside of the same local area network, and are connected to a LAN (Local Area Network) 103. The management server 106 is connected to a WAN (Wide Area Network) 105. A firewall 104 is provided between the LAN 103 and the WAN 105.

In addition, in the present embodiment, an update server 107 for updating the software for the monitoring apparatus 101 is connected to the WAN 105. An example is explained in the present embodiment in which the device management service that manages the devices is provided by the management server 106. However, this is not limited thereto. In addition to one or more information processing apparatuses, the device management service may also be realized by a virtual machine (a cloud service) that uses resources provided by a data center including an information processing apparatus, or a combination thereof. In addition, in the same manner, in addition to one or more information processing apparatuses, the update service for the software that is provided by the update server 107 may also be realized by a cloud service, or a combination thereof.

The monitoring apparatus 101 is an information processing apparatus that monitors a device 102, which is the target of a device management service. The monitoring apparatus 101 acquires operation information for the device such as the occurrence of damage and the like, data related to the replacement or the like of consumable products, or the like from the device 102 via the LAN 103. In addition, the monitoring apparatus 101 is able communicate with the management server 106 even if the firewall 104 is provided, and transmits the data that has been acquired from the device 102 to the management server 106 via the LAN 103, the firewall 104, and the WAN 105. The monitoring apparatus 101 has a proxy function, and is also able to relay communications between the device 102 and the device management service. Note that the monitoring apparatus 101 may also be a network device that is different from the device 102 and has the same functions as the device 102 that is the monitoring target of the monitoring by the monitoring apparatus 101.

The device 102 is a network device that is the management target of the device management system. The device 102 is, for example, a digital multifunction peripheral (MFP) that executes jobs such as copying, printing, and the like, a single-function printer or scanner, a photocopier, a 3D printer or the like, and it is sufficient if this is a network device having a communication function. The device 102, which is the target of the device management service, is monitored by the monitoring apparatus 101, to which it is connected via the LAN 103.

As the device 102 that is the management target, there are devices that are compatible with a self-monitoring function (referred to below as "self-monitoring device(s)") and devices that are not compatible with a self-monitoring function (referred to below as "non-self-monitoring device(s)"). A self-monitoring function is a function in which data such as operation information for the device that is used by the device management service is collected inside of the device itself based on a control of the device 102 itself, and transmitted to the management server 106. The self-monitoring function is provided by, for example a self-monitoring application. Self-monitoring devices can transmit collected data to the management server 106 through the firewall 104 by using the proxy function of the monitoring apparatus 101. Non-self-monitoring devices transmit data such as operation information and the like to the monitoring apparatus 101 in response to polling from the monitoring apparatus 101 or the like. The monitoring apparatus 101 in the present embodiment therefore has two usage formats, a form that causes a self-monitoring device that communicates with the management server 106 to use a proxy function, and a form in which data is collected and transmitted to the management server 106 from a non-self-monitoring device by polling or the like.

The management server 106 provides a device management service that unitarily manages the data for the monitoring apparatus 101 and the device 102. In the device management service, the data such as operation information and the like that has been collected in the device 102 is used. The management server 106 is connected to the monitoring apparatus 101 via the LAN 103, the firewall 104, and the WAN 105. The management server 106 may be a configuration comprising one computer, or it may also be a configuration comprising a plurality of computers. Furthermore, a computer that uses a cloud computing technology may also be used as the management server 106. Note that as was shown in FIG. 1, the management server 106 may also be directly connected to the device 102 via the WAN 105, and the LAN 103.

The update server 107 unitarily manages the data needed in order for the monitoring apparatus 101 to update itself (an update settings file, update data, and the like). The update server 107 is connected to the monitoring apparatus 101 via the LAN 103, the firewall 104, and the WAN 105.

An example has been explained in which the LAN 103 and the WAN 105 are used as a network that connects the monitoring apparatus 101 of the present application with the management server 106 or the update server 107. However, it is sufficient if the network is configured so as to be able to send and receive data, and the communication format does not matter. For example, it may be connected via just one of the LAN 103 and the WAN 105. In addition, for example, instead of a communication network such as a LAN or a WAN, this may also be configured by any of a cellular network such as LTE or 5G, a wireless network, a phone line, a dedicated digital line, or a combination thereof.

Figure 2:
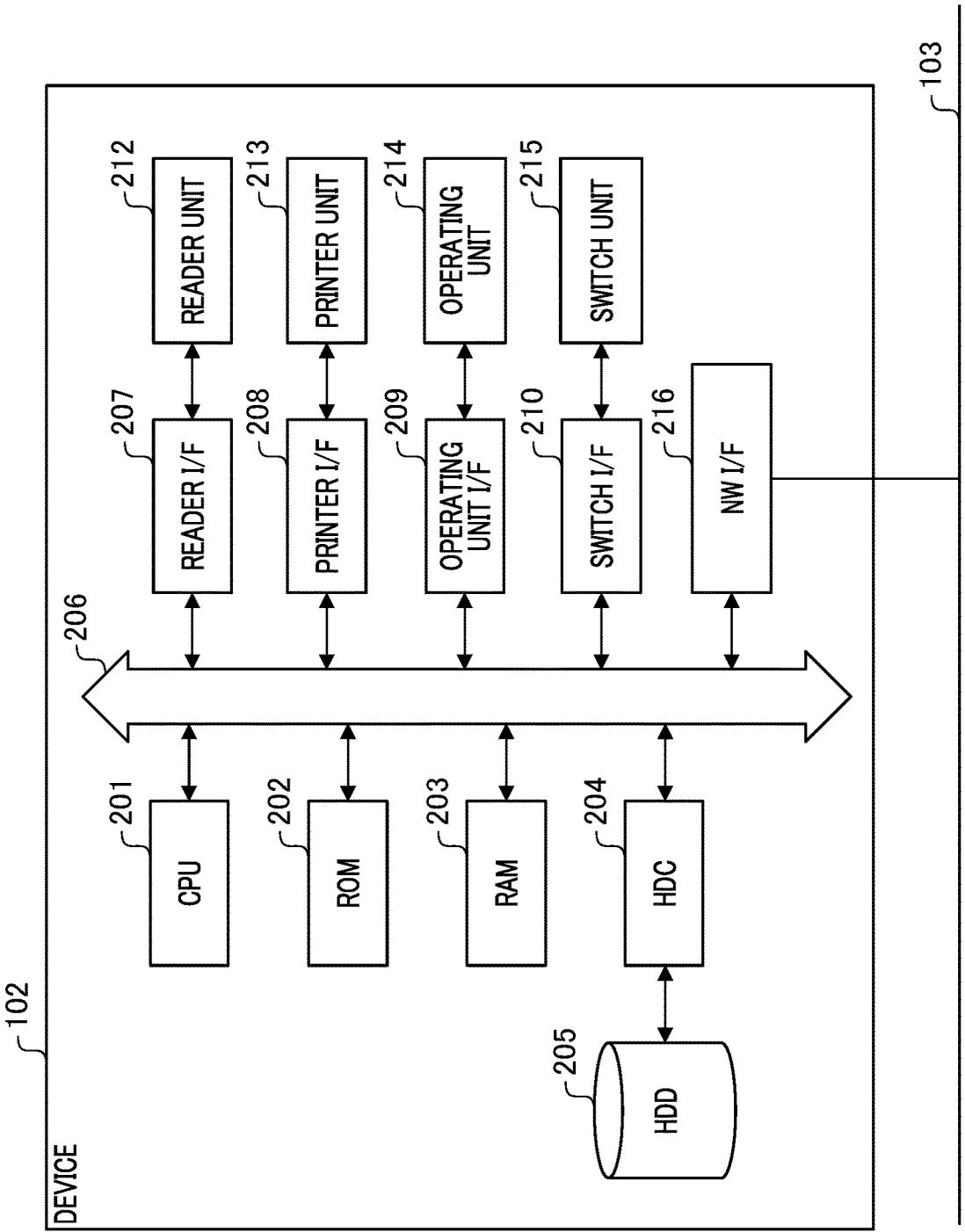
FIG. 2 is a diagram showing a hardware configuration of a device.

FIG. 2 is a diagram showing one example of a hardware configuration of a device 102. The device 102 is provided with a CPU 201, a ROM 202, a RAM 203, an HDC 204, an HDD 205, a reader I/F 207, a printer I/F 208, an operating unit I/F 209, a switch I/F 210, and an NW I/F 216. The CPU 201, the ROM 202, the RAM 203, the HDC 204, the reader I/F 207, the printer I/F 208, the operating unit I/F 209, the switch I/F 210, and the NW I/F 216 are connected via a system bus 206.

The CPU (central processing unit) 201 integrally controls the entirety of the device 102. The CPU 201 integrally controls each device that is connected to the system bus 206 by executing a software that has been stored on the ROM 202 or the HDD 205, and that performs control of the device 102. The ROM (read only memory) 202 is a data read-only memory, and for example, stores the basic control programs and the like for the device 102. The RAM (random access memory) 203 is a data readable/writable memory. The RAM 203 functions as, for example, a work area for the CPU 201 or the like.

The HDC (hard disk controller) 204 controls the HDD 205. The HDD 205 (Hard Disk Drive) is one example of a storage device, and stores each type of program, data, and the like. Note that although in the present embodiment an example is explained in which the device 102 is provided with an HDD 205 that serves as a storage device, this is not limited thereto, and for example, another storage device such as an SSD, a disk drive that loads external media, or the like, may also be used.

The reader I/F 207 is an interface that connects a reader unit 212 and the system bus 206, and controls the reader unit 212. The reader unit 212 reads an original document as an image and generates image data. The image data that has been generated is used in each type of processing such as output to a printer unit 213, saving to the HDD 205, transmitting image data to a host computer that has been connected to a network 217 via a network I/F 216, or the like, according to commands from a user.

The printer I/F 208 is an interface that connects the printer unit 213 and the system bus 206, and controls the printer unit 213. The printer unit 213 prints original documents that have been read by the reader unit 212, and image data that has been saved on the HDD 205 onto a recording medium (for example, printer paper). In addition, the printer unit 213 receives print jobs from the host computer that has been connected to the network 217 via the network I/F unit 216, and prints image data based on the print jobs.

The operating unit I/F 209 is an interface that connects an operating unit 214 and the system bus 206, and controls the operating unit 214. The operating unit I/F 209 controls display to the operating unit 214, and user input from the operating unit 214. The operating unit 214 performs displays to the user, and the reception of operations from the user. The operating unit 214 may be configured by, for example, a display and a button for operations, or it may also be configured by a touch panel. The GUI can be configured such that a user is able to directly operate the screen that has been displayed on the touch panel by associating the input coordinates and the display coordinates in the touch panel.

The switch I/F 210 is an interface that connects a switch unit 215 and the system bus 206, and controls the switch unit 215. The switch unit 215 has a switch for operating the power ON/OFF state of the device 102, and the like. The NW (network) I/F 216 is a communications interface that connects the device 102 and the LAN 103. The CPU 201 communicates with other information devices on the network via the NW I/F 216 and the network.

Figure 3:
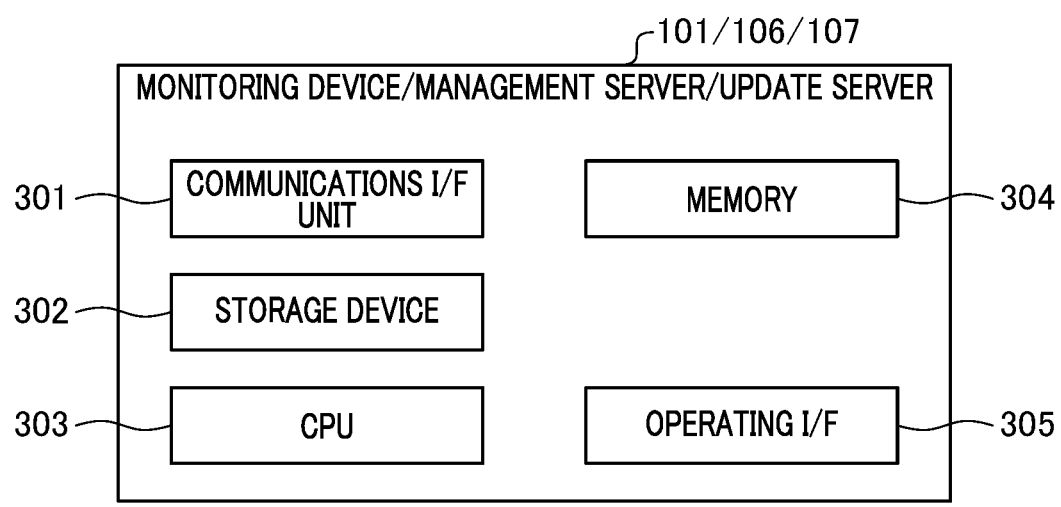
FIG. 3 is a diagram showing a hardware configuration of a management server, a monitoring apparatus, and an update server.

FIG. 3 is a diagram showing one example of a hardware configuration for the monitoring apparatus 101, the management server 106, and the update server 107. The monitoring apparatus 101, the management server 106, and the update server 107 have, for example, the same hardware configuration as a general information processing apparatus, and are provided with a CPU 303, a memory 304, a storage device 302, an operating I/F 305, and a communications I/F 301.

The CPU 303 of the monitoring apparatus 101 controls the monitoring apparatus 101, the CPU of the management server 106 controls the management server 106, and the CPU 303 of the update server 107 controls the update server 107. The CPU 303 realizes each type of control by loading and executing a program from the storage device 302 on the memory 304. The storage device 302 stores an OS (operating system) and programs, management data, data that has been collected from external systems or apparatuses or the like, and the like. The memory 304 functions as a work area or the like of the CPU 303. The operating I/F 305 outputs the execution results for each type of data, program, and the like on the connected display device such as a display or the like, and receives inputs from the input device that has been connected thereto. The communications I/F 301 is a network interface for performing communications with external systems and devices. The communications I/F 301 of the monitoring apparatus 101 is connected to the LAN 103. The communications I/F 301 of the management server 106 and the communications I/F 301 of the update server 107 are connected to the WAN 105. In addition, the monitoring apparatus 101 is also provided with a display device that is not illustrated, and display is performed to the display device according to output from the operating I/F 305.

Figure 4:
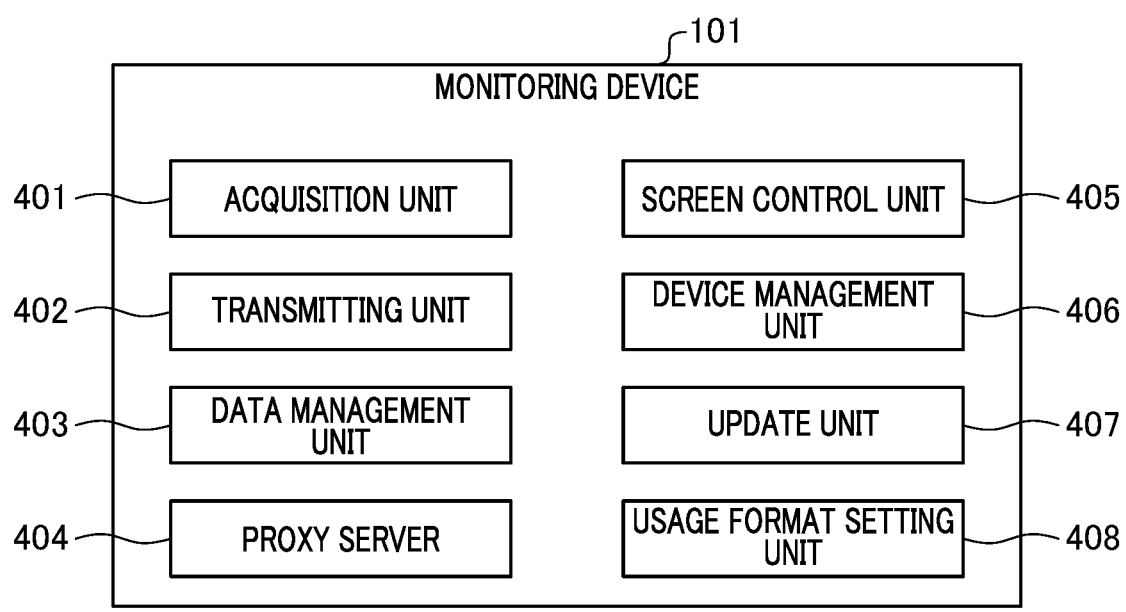
FIG. 4 is a diagram showing a software configuration of a monitoring apparatus.

FIG. 4 is a diagram showing the software configuration (functional configuration) of the monitoring apparatus 101. The monitoring apparatus 101 has an acquisition unit 401, a transmitting unit 402, a data management unit 403, a proxy server 404, a screen control unit 405, a device management unit 406, and an update unit 407. The acquisition unit 401 acquires each type of data from external devices via a network. For example, the acquisition unit 401 acquires data such as operational information and the like from the device 102, and acquires the update settings file and update data from the update server 107. The transmitting unit 402 transmits each type of data and commands to an external device via a network. For example, the transmitting unit 402 sends the operational information and the like acquired from the device 102 to the management server 106. In addition, the transmitting unit 402 performs polling on the non-self-monitoring devices.

The data management unit 403 manages each type of data. For example, the data management unit 403 manages processing for storing data such as the operational information and the like that has been acquired from the device 102, and the device information for the device 102 that is the management target. In addition, the data management unit 403 manages the update settings file and update data acquired from the update server 107. In addition, the data management unit 403 manages the version information for the end-user license agreement (EULA) for each usage format for which agreement has been obtained from the user.

The proxy server 404 relays data communication between the device 102 and the management server 106. Specifically, the proxy server 404 aggregates the communications from the device 102 that has a self-monitoring function, and relays communications between the device 102 and the device management service. Note that although an example is explained in the present embodiment in which the proxy server 404 is built into the monitoring apparatus 101, the proxy server 404 may also be provided externally to the monitoring apparatus 101. In addition, another proxy server in addition to the proxy server 404 may also be provided in the communications path for the device 102 and the management server 106, making this a multistage proxy.

The screen control unit 405 generates screens based on information managed by the data management unit 403, and displays these on an output apparatus via the operating I/F 305. In addition, the screen control unit 405 receives input information from an input apparatus via the operating I/F 305, and stores this on the data management unit 403. The device management unit 406 performs the setting of the proxy server information it holds, registration commands, and the like, on the device 102 that has a self-monitoring function. In addition, the device management unit 406 performs the installation commands, starting/stopping commands, and the like for the application that provides the device 102 with the self-monitoring function. In addition, the device management unit 406 manages periodic polling for the device 102 that does not have a self-monitoring function.

The update unit 407 performs processing related to the updates for the monitoring apparatus 101 by using update data that is managed by the data management unit 403. As a portion of the processing relating to the updates, the update unit 407 also functions as a comparison means that determines whether or not the EULA version according to the current usage format for the monitoring apparatus 101 has been updated and is in a state in which user agreement is necessary by comparing EULA versions. The usage format setting unit 408 also performs processing to change the usage format of the monitoring apparatus 101. As the usage format of the monitoring apparatus 101, there is a first usage format ("proxy") in which the monitoring apparatus 101 is used as a proxy server, and a second usage format ("polling") in which the device 102 is monitored using acquisition processing by the acquisition unit 401 by polling or the like. The software that is executed by the monitoring apparatus 101 operates in different operation modes depending on the usage format. The usage format of the monitoring apparatus 101 is set and changed based on commands from a user or the management server 106.

Figure 5:
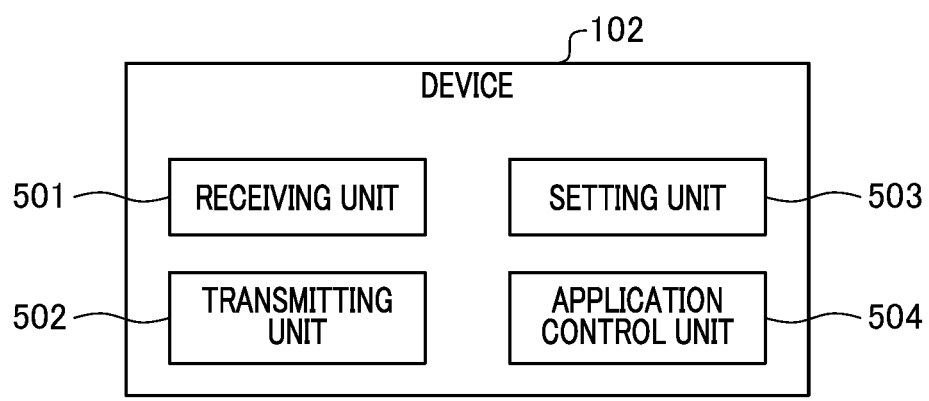
FIG. 5 is a diagram showing a software configuration of a device.

FIG. 5 is a diagram showing one example of a software configuration (function configuration) for the device 102. The device 102 has a receiving unit 501, a transmitting unit 502, a setting unit 503, and an application control unit 504. The receiving unit 501 receives requests from an external device via a network. For example, requests to the device 102 to the effect that data such as operational information or the like is collected and transmitted serve as the requests. The transmitting unit 502 transmits data such as the operation information and the like to an external device via the network. For example, the transmitting unit 502 transmits responses to requests received by the receiving unit 501. The setting unit 503 performs each type of setting such as setting the proxy and the like based on information that has been designated by the monitoring apparatus 101 or the like.

The application control unit 504 controls communications with the management server 106, and executes the installation and updates of applications. Downloads may be performed via the proxy server 404 of the monitoring apparatus 101, or they may also be performed without using the proxy server 404 as an intermediary. In addition, the application control unit 504 notifies the management server 106 about information for installed applications (for example, IDs, versions, and the like) via the transmitting unit 502.

Specifically, the application control unit 504 downloads installation files and the like for the self-monitoring application from the management server 106 based on requests received by the receiving unit 501 (installation requests). In addition, the application control unit 504 uses the installation files of the self-monitoring application that has been downloaded to execute the installation of the self-monitoring application. The installed self-monitoring application monitors the state inside the device 102 according to the control of the application control unit 504. In addition, the self-monitoring application collects data that has been designated inside of the device 102 and transmits the collected data to the monitoring apparatus 101 according to a predetermined schedule. In addition, the self-monitoring application also notifies the monitoring apparatus 101 of the monitoring results in the case in which a predetermined change in the device 102 (for example, the occurrence of an error) has been detected.

Software updates for the monitoring apparatus 101 will now be explained. There are cases in which automatic update processing is possible for the software updates, and cases in which manual update processing is necessary. Generally, in the case in which the contents of the end-user license agreement (EULA) have changed, user agreement with respect to the changes to the EULA is necessary, automatic update processing cannot be performed, and manual update processing is necessary. However, if the functions of the monitoring apparatus 101 are limited until the completion of the manual update by the user, there is a concern that a case will occur in which monitoring will not be continued in the systems for which constant monitoring is necessary. In this context, in the present embodiment, in order to continue monitoring as much as possible, it is made possible to automatically perform software updates without user agreement to the changes in the EULA in the case in which the changes to the contents of the EULA do not affect the usage format of the monitoring apparatus 101.

Figure 6:
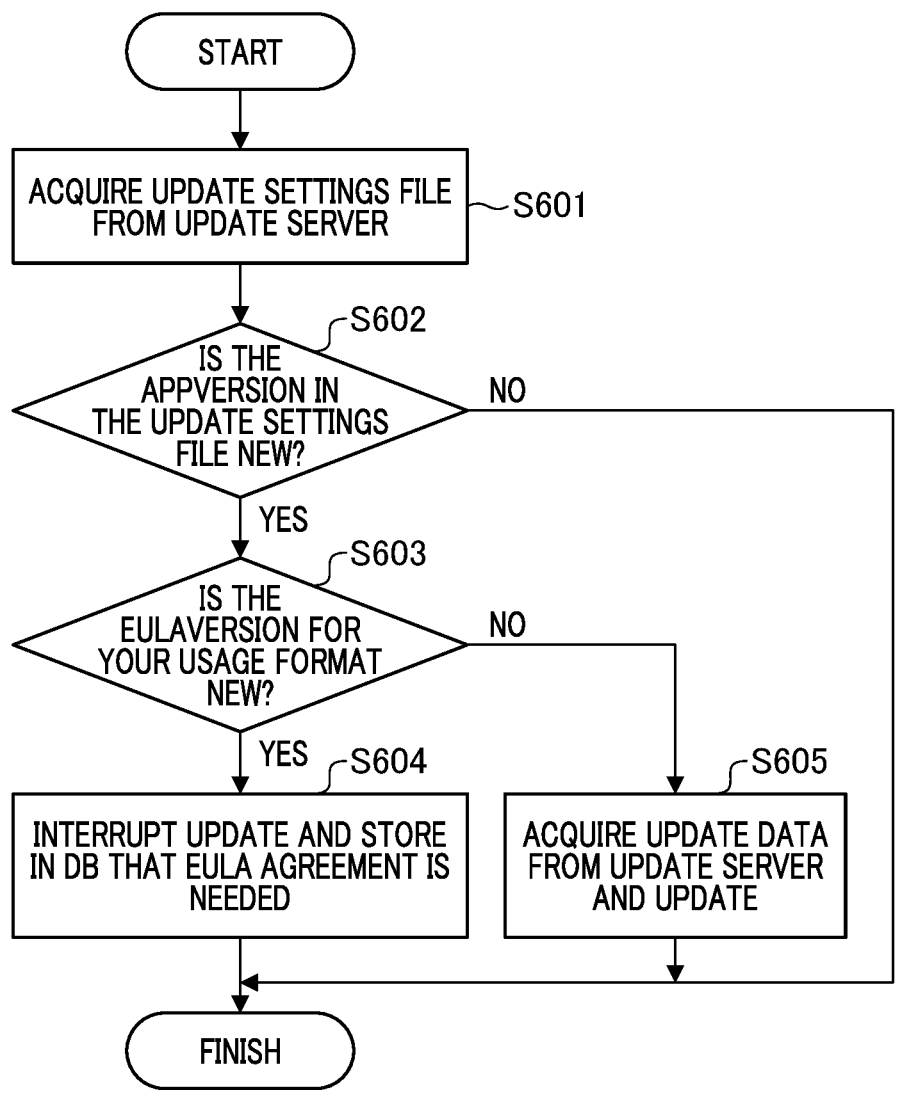
FIG. 6 is a flowchart showing automatic update processing for a monitoring apparatus.

FIG. 6 is a flowchart showing automatic update processing for the monitoring apparatus 101. During the automatic update processing, acquisition of the update settings file from the update server 107 is periodically performed by the monitoring apparatus 101, and in the case in which it has been determined that the version of the monitoring apparatus 101 has been updated and there are no changes in the license agreement that are linked to the usage format for the user, updates are performed. Each processing that is shown in the flowchart in FIG. 6 is realized by the CPU 303 of the monitoring apparatus 101 reading out and executing a control program that is stored on the storage device 302 on the memory 304.

During step S601, the acquisition unit 401 of the monitoring apparatus 101 acquires the update settings file from the update server 107. In addition, the acquired update settings file is saved in the data management unit 403. In this context, the update settings file will be explained. An update settings file is a file showing the update settings including the software version relating to the update and the versions of the license agreement for this software for each usage format. FIG. 7 is a diagram showing one example of an update settings file. Note that in the present embodiment, the update settings file is managed in a javascript object notation (JSON) format. However, this may also be managed using other data formats such as an extensible markup language (XML) format, or the like.

In FIG. 7, the "region" is information indicating the information for a region in which the monitoring apparatus 101 is sold and used. The "appVersion" is information showing the latest version of the software for the monitoring apparatus managed by the management server 106. The "type" is information indicating the usage format of the monitoring apparatus 101. In the case in which the "type" is "proxy", this indicates that the monitoring apparatus 101 is in a usage format in which the proxy function of the monitoring apparatus 101 is being used by the device 102. In the case in which the "type" is "polling", this indicates that the monitoring apparatus 101 is in a usage format in which polling is performed on the device 102, and the monitoring apparatus 101 acquires information from the device 102 and transmits this to the management server. Note that there may also be usage formats for the monitoring apparatus 101 other than the usage formats corresponding to "proxy" and "polling", and in the case in which there are other usage formats, the settings values corresponding to these usage formats will be recorded in the "type".

The "eulaVersion" is information showing the latest EULA version for the monitoring apparatus that is managed by the update server 107. The "eulaVersion" is linked to the usage format of the monitoring apparatus, and each of the "eulaVersion" for the case in which the "type" is "proxy", and the "eulaVersion" for the case in which the "type" is "polling", are recorded therein. Note that the update information may also be managed by using information of varieties that are different from each type of information that is shown in FIG. 7. The information corresponding to the information that is recorded in the update settings file is also stored in the data management unit 403 of the monitoring apparatus 101. That is, information that shows the region, version, usage format (either of "proxy" or "polling"), and the EULA version of the monitoring apparatus 101 is stored in the data management unit 403 of the monitoring apparatus 101.

During step S602, the update unit 407 determines whether or not it is necessary to update the monitoring apparatus 101. That is, the update unit 407 determines if the software version for the monitoring apparatus that is recorded in the update settings file that was acquired during step S601 is a newer version than the current software version for the monitoring apparatus 101. Specifically, the update unit 407 compares the current version for the monitoring apparatus 101 that is managed by the data management unit 403 and the latest version for the monitoring apparatus that is recorded in the acquired update settings file (the "app Version" in FIG. 8). In the case in which the versions are the same, it is not necessary to update the monitoring apparatus 101, and therefore, the present processing is completed. In contrast, in the case in which the latest version for the monitoring apparatus in the update setting file is newer than the current version for the monitoring apparatus 101, the update processing for the monitoring apparatus 101 proceeds, and therefore, the processing for step S603 is performed.

In step S603, the update unit 407 determines whether or not automatic update processing is possible. The case in which an automatic update cannot be performed and a manual update is necessary is the case in which user agreement to the EULA is necessary, which is the case in which the EULA version for the usage format of the monitoring apparatus 101 is new. In contrast, in the case in which user agreement to the EULA is not necessary, that is, in the case in which there are no changes to the EULA version for the usage format of the monitoring apparatus 101, an automatic update is possible. Therefore, automatic updates are also possible in the case in which only the EULA version for the usage format that is different than the usage format of the monitoring apparatus 101 is new.

The update unit 407 compares the current usage format and the EULA version for the monitoring apparatus 101 that are managed by the data management unit 403 with the EULA version that is linked to the usage format for the monitoring apparatus 101, which is recoded in the update settings file. For example, in the case in which a device is being managed by using the proxy function of the monitoring apparatus 101 (the case in which the usage format for the monitoring apparatus 101 is "polling") it is determined if the "eulaVersion" for "polling" that is recorded in the update settings file is new. In the case in which the EULA version that is linked to the usage format for the monitoring apparatus 101 that is recorded in the update settings file is new, user agreement is required, and therefore, the processing for step S604 is performed. In contrast, in the case in which the EULA version that is linked to the usage format for the monitoring apparatus 101 that is recorded in the update settings file is the same, an automatic update is possible, and the processing for step S605 is performed.

During step S604, the update unit 407 does not perform the update processing for the monitoring apparatus 101, and executes processing for requesting user agreement to the license agreement related to the update. Specifically, the update unit 407 saves a flag to the data management unit 403 that displays on the UI that a user agreement operation toward the EULA is necessary for the update, and completes the processing. This flag is a flag for the screen control 405 to display, on the screen, the instructions that a user agreement operation toward the EULA is necessary in order to update the monitoring apparatus 101 the next time that a user begins the use of the monitoring apparatus 101. Note that during the step S604, instead of saving the flag, a means such as an email or the like may also be used to notify the user that a user agreement operation toward the EULA is necessary for the update. Upon receiving agreement from the user to the license agreement, the update unit 407 acquires update data from the update server 107, and executes updates relating to the software based on the update data.

During step S605, the monitoring apparatus 101 automatically performs the update processing. First, the acquisition unit 401 acquires the update data from the update server 107, and stores this to the data management unit 403. Next, the update unit 407 performs the update for the monitoring apparatus by using the update data, and completes the processing.

Due to the above processing, even if the "eulaVersion" for "polling" is updated, the users who use the "proxy" function do not need to agree to the EULA, and it is possible for the monitoring apparatus 101 to automatically update without the user's agreement and continue to provide the proxy function. In the case in which the monitoring apparatus 101 monitors the device 102 by relaying the communications between the device 102 and the management server 106 via the proxy server 404, the communications format for when the acquisition unit 401 performs acquisition, and the communications format for when the transmitting unit 402 performs transmissions are automatically updated. In contrast, even if the "eulaVersion" for "proxy" is updated, users who use the "polling" function do not need to agree to the EULA, and the monitoring apparatus 101 can be automatically updated without the user's agreement and to continue polling. Thereby, in the case in which the monitoring apparatus 101 monitors the device 102 on a network by acquisition processing by the acquisition unit 401, functions such as, for example, security measure functions related to the proxy function, or communication functions that the proxy can relay, are automatically updated.

As was explained above, according to the present processing, it is possible to automatically perform updates in the case in which it has been determined that there have been no changes to the license agreement linked to the usage format of the user of the monitoring apparatus. By executing the software updates according to the usage format in this manner, it becomes possible to automatically update the monitoring apparatus without the time and labor of making commands from the UI even if there have been changes to the EULA relating to the function of a usage format that the user themselves is not using. In addition, by automatically updating the monitoring apparatus, it is possible to continue to monitor the device.

Figure 8:
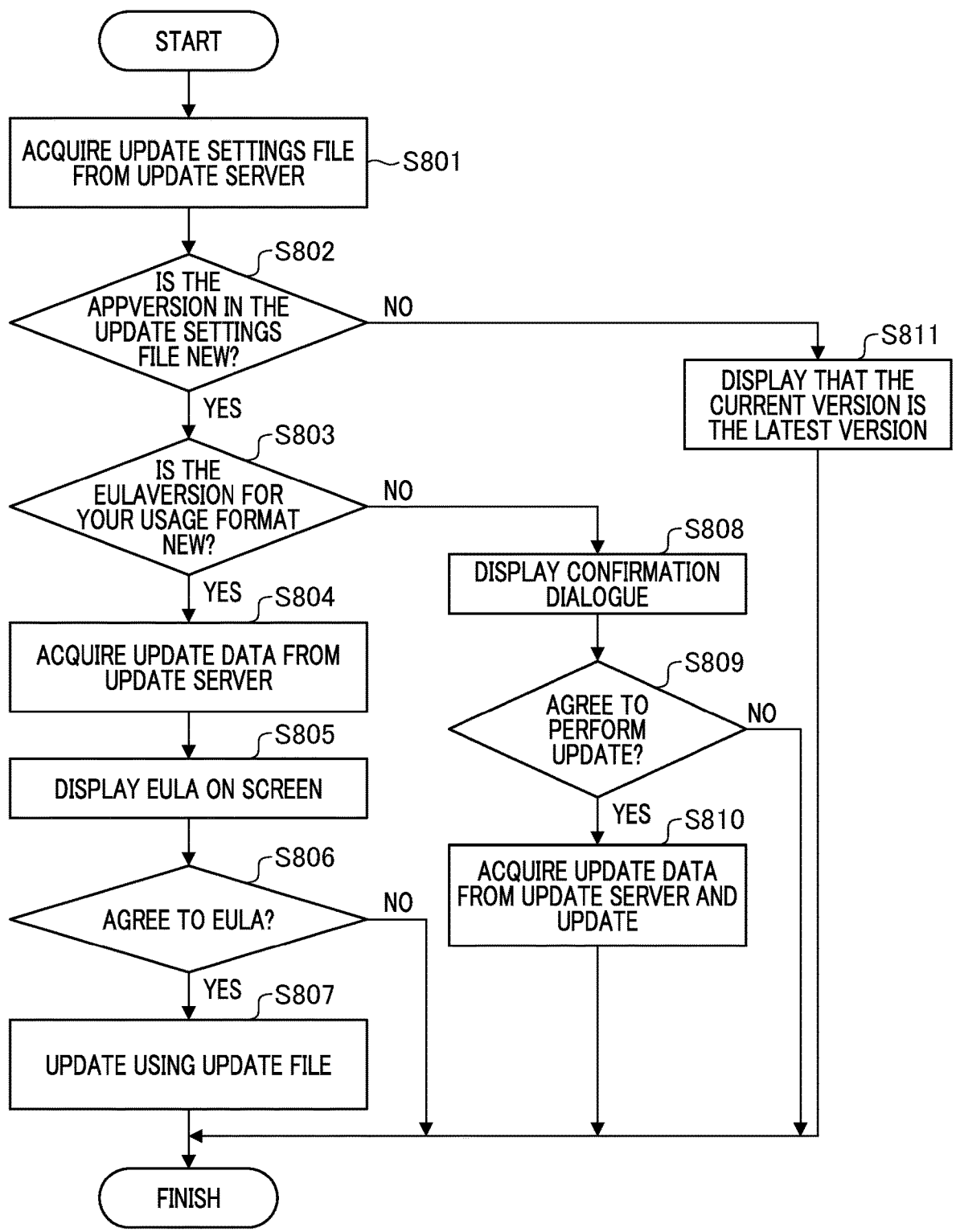
FIG. 8 is a flowchart showing manual update processing for a monitoring apparatus.

FIG. 8 is a flowchart showing the manual update processing for the monitoring apparatus 101. During the manual update processing, update commands are received by a UI operation made by the user of the monitoring apparatus 101, and the acquisition of the update settings file from the update server 107 is performed. In addition, in the case in which it has been determined that there has been a change to the license agreement linked to the usage format for the user of the monitoring apparatus 101, a display of the EULA is performed, and the update is performed after obtaining the user's agreement. Each processing that is shown in the flowchart in FIG. 8 is realized by the CPU 303 of the monitoring apparatus 101 reading out and executing a control program that is stored on the storage device 302 on the memory 304.

Step S801 to step S803 are the same processing as step S601 to step S603. First, during step S801, the acquisition unit 401 of the monitoring apparatus 101 acquires the update settings file from the update server 107. In addition, the update settings file that was acquired is saved to the data management unit 403.

During step S802, the update unit 407 compares the current version for the monitoring apparatus 101 that is managed by the data management unit 403 with the latest version for the monitoring unit that is recorded in the update settings file. In the case in which the versions are the same, the processing for step S811 is performed. During step S811, the screen control unit 405 displays that the current version for the monitoring apparatus 101 is the current version on a display unit, which is not illustrated. In contrast, in the case in which the version for the monitoring device that is indicated in the update settings file is newer than the current version for the monitoring apparatus 101, the processing for step S803 is performed.

During step S803, the update unit 407 compares the current EULA version for the monitoring apparatus 101 that is linked to the current usage format for the monitoring apparatus 101 that is managed by the data management unit with the EULA version that is linked to the usage format for the monitoring apparatus, which is recorded in the update settings file. In the case in which the EULA version that is linked to the usage format for the monitoring apparatus that is recorded in the update settings file is new, the processing for the step S804 is performed. In the case in which the EULA versions are the same, the processing for step S808 is performed.

During step S804, the acquisition unit 401 acquires the update data from the update server 107, and saves this to the data management unit 403. Next, during step S805, the update unit 407 executes processing to request agreement from the user to the license agreement related to the update. Specifically, the update unit 407 displays the EULA that is included in the update data saved to the data management unit 403 on the screen by sending a command to the screen control unit 405. On the screen on which the EULA is displayed, a button that reads "agree to the new EULA", and a button that reads "do not agree to the new EULA" are displayed together, and the user performs the operation of selecting one of the buttons. During step S806, the update unit 407 determines if the user has pressed the button that reads "agree to the new EULA" via the screen control unit 405. In the case in which it can be detected that the "agree to the new EULA" button has been pressed, the processing for step S807 is performed. In contrast, in the case in which is cannot be detected that the button that reads "agree to the new EULA" has been pressed, the present processing is completed. During step S807, the update unit 407 performs the update for the monitoring apparatus 101 by using the update data that is stored on the data management unit 403, and the present processing is completed.

During step S808, the update unit 407 displays a screen that confirms the execution of the update by sending a command to the screen control unit 405. A button that reads "agree to perform the update" and a button that reads "do not agree to perform the update" are displayed together on the screen to confirm the execution of the update, and the user performs the operation of selecting one of the buttons. Note that during step S808, even in the case in which an EULA version that is not linked to the usage format of the monitoring apparatus 101 has been updated, this EULA is not displayed on the screen, and it is not necessary for the user to agree to the changes to the contents of this EULA.

During step S809, the screen control unit 405 determines if the user has pressed the button that reads "agree to perform the update". In the case in which it can be detected that the "agree to perform the update" button has been pressed, the processing for step S810 is performed. In contrast, in the case in which it cannot be detected that the "agree to perform the update" button has been pressed, the present processing is completed. During step S810, the acquisition unit 401 acquires the update data from the update server 107, and saves this to the data management unit 403. Then, the update unit 407 performs the update of the monitoring apparatus 101 by using the update data, and completes the present processing.

In the present embodiment, an example has been explained in which the EULA data is included in the update data, and therefore, during step S805, the update data has been acquired from the update server 107 before displaying the EULA. However, the present invention is not limited thereto. For example, the processing may also be made such that the EULA data is managed separately from the update data and the update settings file, the EULA data is acquired from the update server 107 before displaying the EULA during step S805, and the update data is acquired only in the case in which the user agrees to the EULA. In addition, the EULA data may also be included in the update settings file, or the update data and the EULA data may also be included in the update settings file.

As has been explained above, in the present embodiment, software updates are controlled according to the usage format of the monitoring apparatus 101. In addition, in the case in which the changes to the contents of the EULA do not affect the usage format of the monitoring apparatus 101, it is possible to perform software updates without user agreement to the changes to the EULA.

Second Embodiment

In the first embodiment, in the case in which it was determined that agreement to the EULA is not necessary for the current usage format of the monitoring apparatus 101, even if an EULA that is not for the current usage format has been updated, updates are performed without gaining agreement to this EULA. Therefore, there are cases in which user agreement is not gained for EULAs that are not for the current usage format, and in the case in which the usage format for the monitoring apparatus 101 is changed after a software update for the monitoring apparatus 101, an operation to agree to the EULA becomes necessary again. In this context, in the present embodiment, in the case in which the usage format for the user is changed after an update has been performed without gaining agreement to the EULA, control is performed such that it is possible to change the usage format only in the case in which the user agreement has been obtained by displaying the EULA. The configuration for the device monitoring system according to the present embodiment is the same as that in the first embodiment. Below, only the differences with the first embodiment will be explained, and explanations of the processing that is the same as that in the first embodiment will be omitted by assigning the same reference numerals thereto.

Figure 9:
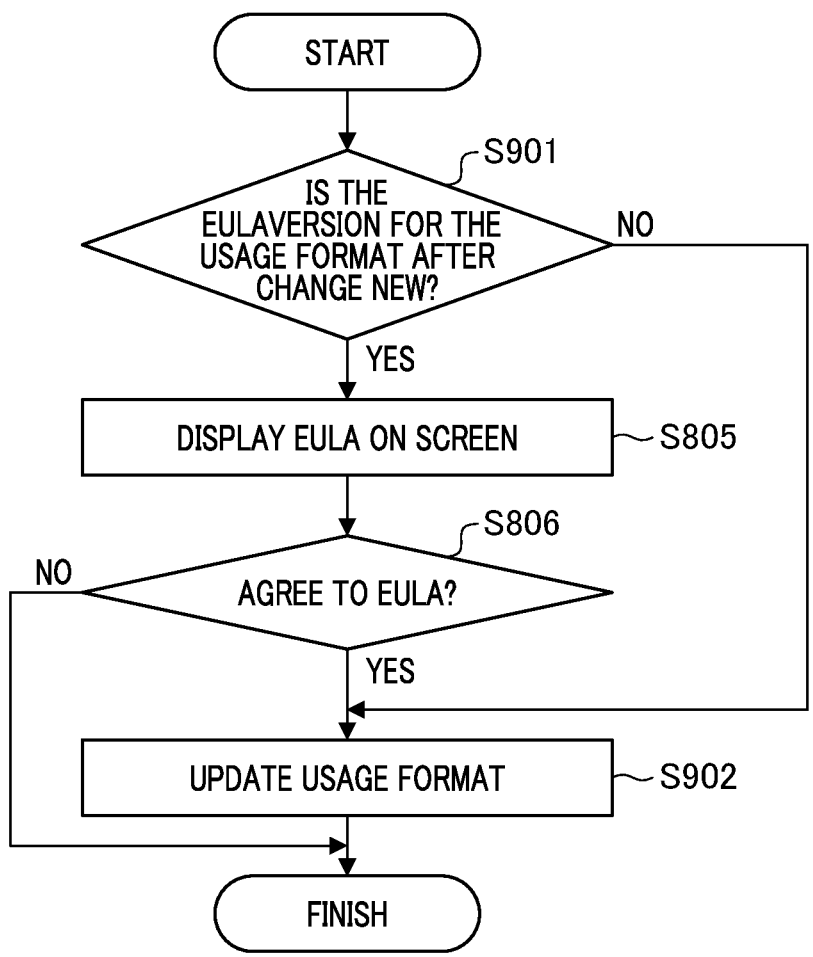
FIG. 9 is a flowchart showing usage format update processing for a monitoring apparatus according to a second embodiment.

The processing for the monitoring apparatus 101 for the case in which the usage format of the monitoring apparatus 101 is changed will be explained. FIG. 9 is a flowchart showing the usage format change processing for a monitoring apparatus according to the second embodiment. The processing that is shown in FIG. 9 is started by the monitoring apparatus 101 receiving a usage format change command from the user. Each of the processes that are shown in the flowchart in FIG. 9 is realized by the CPU 303 of the monitoring apparatus 101 reading out and executing a control program that is stored on the storage device 302 on the memory 304.

When a usage format change command is received, the monitoring apparatus 101 performs a determination as to whether agreement to the EULA is necessary. First, in step S901, the usage format setting unit 408 determines if the EULA version for the usage format after the change is newer than the EULA version that the user has agreed to in the current usage format. Specifically, the usage format setting unit 408 references the EULA versions for each usage format for which user agreement has been obtained, which are stored in the data management unit 403, and determines if the EULA version for the usage format after the change is newer than these EULA versions. In the case in which it is determined that the EULA version for the usage format after change is newer, the processing for step S805 is performed. In contrast, in the case in which it is determined that the EULA version for the usage format after the change is the same as, or older than the EULA version for which user agreement has been obtained, the processing proceeds to step S902. Note that in the case in which it has been determined that the EULA version of the license agreement after the change is older, this may also serve as a determination that a change to the EULA has been made, and the processing for step S805 may also be executed.

During step S805, the screen control unit 405 displays the EULA included in the update data stored in the data management unit 403 on the screen. During step S806, the screen control unit 405 determines if the button that reads "agree to the EULA" has been pressed by the user. In the case in which the pressing of the button that reads "agree to the EULA" has been detected, the processing for step S902 is performed. In contrast, in the case in which the pressing of the button that reads "agree to the EULA" cannot be detected, the usage format is not changed, and the present processing is completed. During step S902, the usage format setting unit 408 changes the usage format for the monitoring apparatus 101. Specifically, the usage format setting unit 408 overwrites the usage format information on the data management unit 403, and saves the information for the usage format after the change.

As has been described above, according to the present embodiment, in the case in which the user changes the usage format after an automatic update has been performed in the first embodiment, it is possible to display the EULA for the usage format after the change again if agreement to the EULA is necessary, and to obtain user agreement to this EULA.

Third Embodiment

In the first embodiment, whether or not there has been a change to the EULA linked to the usage format is confirmed, and in the case in which it has been determined that there has been a change to the EULA for the usage format itself, automatic updates are limited. However, even if the EULA is changed, among the libraries that are used by the monitoring apparatus 101, irrespective of the changed contents of the latest version of the EULA, there are ones which can be updated to the libraries for the latest version with the contents of the current EULA to which the user has currently agreed. In this context, the libraries are Dynamic Link Library files that configure a portion of the program for the monitoring apparatus 101. In this context, in the present embodiment, even in the case in which it has been determined that there has been a change to the EULA that is linked to the usage format for the monitoring apparatus 101, just the libraries that are not related to the updated EULA are automatically updated first without waiting for user agreement to the EULA. The configuration for the device monitoring system according to the present embodiment is the same as that in the first embodiment. Below, only the differences with the first embodiment will be explained, and explanations of the processing that is the same as that in the first embodiment will be omitted by assigning the same reference numerals thereto.

Figure 10:
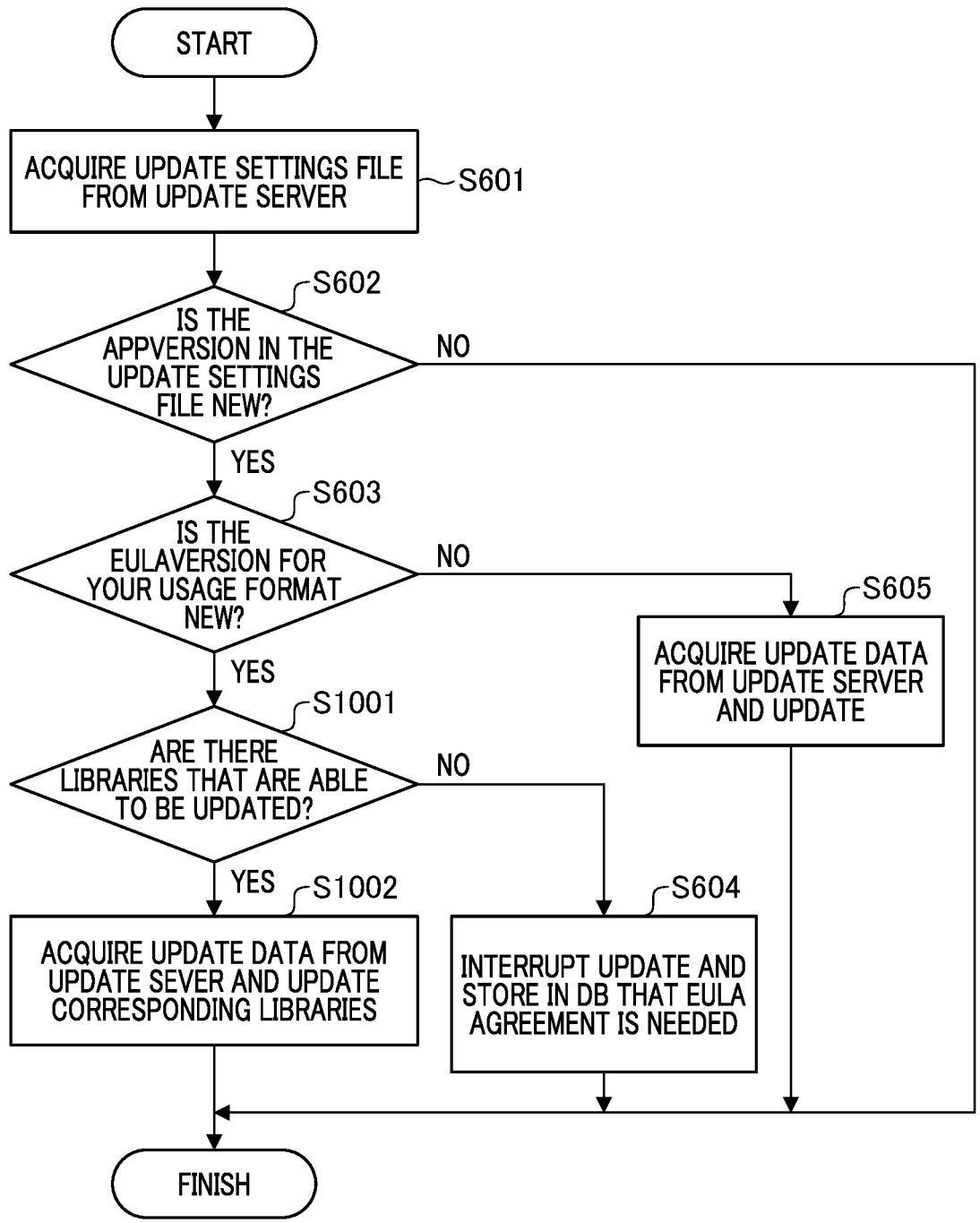
FIG. 10 is a flowchart showing automatic update processing for a monitoring apparatus according to a third embodiment.

FIG. 10 is a flowchart showing the automatic update processing for a monitoring apparatus 101 according to the third embodiment. Each processing shown in the flowchart in FIG. 10 is realized by the CPU 303 of the monitoring apparatus 101 reading out and executing a control program that is stored on the storage device 302 on the memory 304.

First, in the same manner as in the first embodiment, during step S601, the acquisition unit 401 acquires the update settings file from the update server 107. In addition, the acquired update settings file (refer to FIG. 11, which is to be described below) is saved in the data management unit 403. In this context, in addition to the information that has been explained in the first embodiment (FIG. 7), a list of updatable libraries is also recorded in the update settings file that is acquired. FIG. 11 is a diagram showing one example of an update settings file in the third embodiment. The "updatableLibrary" shows a list of the libraries that are able to be updated.

During step S602, the update unit 407 compares the current version for the monitoring apparatus that is managed by the data management unit 403 with the latest version for the monitoring apparatus that is recorded in the update settings file. In the case in which the versions are the same, the present processing is completed. In contrast, in the case in which the version for the monitoring apparatus that has been recorded in the update settings file is newer, the processing for step S603 is performed.

During step S603, the update unit 407 determines whether or not an automatic update is possible. The update unit 407 compares the current EULA version for the monitoring apparatus 101 in the current usage format for the monitoring apparatus 101 that is managed by the data management unit 403 with the EULA version linked to the usage format for the monitoring apparatus 101 that is recorded in the update settings file. In the case in which the EULA version that is linked to the usage format for the monitoring apparatus 101 that is recorded in the update settings file is new, the processing for step S1001 is performed. In contrast, in the case in which the EULA versions are the same, the processing for step S605 is performed. During step S605, the acquisition unit 401 acquires the update data from the update server 107, and saves this to the data management unit 403. The update unit 407 performs the update for the monitoring apparatus using the update data, and the present processing is finished.

During step S1001, the update unit 407 determines whether or not there are libraries that can be updated. The update unit 407 references the updatable library information that is recorded in the update settings file ("updatableLibrary"), and determines whether or not there is updatable library information. In the case in which updatable libraries exist, the processing for step S1002 is performed. In contrast, in the case in which none exist, the processing for step S604 is performed. During step S604, the update unit 407 does not perform the update processing for the monitoring apparatus 101, and in an update, saves a flag that displays on the UI that an operation for user agreement to the updated EULA is necessary to the data management unit 403, and completes the present processing. This flag is used in order for the screen control 405 to display, on the screen, a message to this effect the next time that a user begins to use the monitoring apparatus 101.

During step S1002, the acquisition unit 401 acquires the update data from the update server 107. Furthermore, the update unit 407 extracts the corresponding libraries from among the update data based on the updatable library information, and overwrites and updates the current libraries for the monitoring apparatus 101. Furthermore, the update unit 407 saves a flag to the data management unit 403 that displays on the UI that as the agreement operation to the EULA by the user for the libraries other than those that were updated, an agreement operation for the EULA is needed for the update, and completes the present processing.

As has been explained above, according to the present embodiment, it is also possible to update just the libraries that are not related to the EULA update first without waiting for user agreement to the EULA in the case in which the monitoring apparatus 101 has determined that there has been a change to the EULA for the current usage format. It is thereby possible to rapidly perform updates to the libraries that should be applied quickly, such as fixes to bugs, and it is also possible to improve the security of the monitoring apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-054097, filed Mar. 29 2022, which is hereby incorporated by reference herein in its entirety.

What is claimed is:

1. A monitoring apparatus that monitors a network device that is a management target of a device management service and executes software that operates in different operation modes according to a usage format, the monitoring apparatus comprising:
 a memory storing instructions; and
 a processor executing the instructions to:
  determine whether or not a user agreement to a second version of a license agreement is necessary by comparing a first version and the second version of the license agreement that are linked to a current usage format of the monitoring apparatus, in a case where a current version software installed in the monitoring apparatus, which operates in the different operation modes according to the usage format, needs updating, wherein:
   the first version of the license agreement corresponds to the current version software,
   the second version of the license agreement corresponds to an updated version software,
   in a case where the second version of the license agreement that is linked to the current usage format of the monitoring apparatus is not newer than the first version, the processor determines that the user agreement to the second version of the license agreement is not necessary, and
   in a case where the second version of the license agreement that is linked to the current usage format of the monitoring apparatus is newer than the first version, the processor determines that the user agreement to the second version of the license agreement is necessary; and
  update the current version software to the updated version software, in a case where the user agreement to the second version of the license agreement is determined to be not necessary.

2. The monitoring apparatus according to claim 1, wherein the second version of the license agreement that is linked to the current usage format for the monitoring apparatus is acquired from an update settings file that shows a software version of the updated version software, and license agreement versions for each usage format.

3. The monitoring apparatus according to claim 1, wherein:
 the monitoring apparatus has a proxy function configured to relay communications between the device management service and the network device, and
 the usage format includes:
  a format in which the proxy function of the monitoring apparatus is used by the network device; and
  a format in which the monitoring apparatus collects data from the network device and transmits the data to the device management service.

4. The monitoring apparatus according to claim 1, wherein:
 in the case where the user agreement to the second version of the license agreement is determined to be necessary, the processor performs processing to request an agreement to the second version of the license agreement from the user, and in a case where the agreement to the second version of the license agreement has been received from the user, the processor updates the current version software to the updated version software.

5. The monitoring apparatus according to claim 1, wherein in the case where the user agreement to the second version of the license agreement is determined to be necessary, and in a case where an existing library is updatable without an agreement from the user to the second version of the license agreement, the processor performs updates relating to the library.

6. The monitoring apparatus according to claim 5, wherein information that shows the library that is updatable is included in an update settings file that shows a software version of the updated version software, and license agreement versions for each usage format.

7. The monitoring apparatus according to claim 1, wherein the processor:
further executes the instructions to set a usage format for the monitoring apparatus; and
upon changing the usage format for the monitoring apparatus, in a case where the user has not agreed to the version of the license agreement linked to the usage format after the change:
performs processing to request an agreement to the second version of the license agreement from the user; and
in a case where the agreement to the second version of the license agreement has been received from the user, changes the usage format.

8. A control method for a monitoring apparatus that monitors a network device that is a management target of a device management service and executes software that operates in different operation modes according to a usage format, the control method comprising:
determining whether or not a user agreement to a second version of a license agreement is necessary by comparing a first version and the second version of the license agreement that are linked to a current usage format of the monitoring apparatus, in a case where a current version software installed in the monitoring apparatus, which operates in the different operation modes according to the usage format, needs updating, wherein:
the first version of the license agreement corresponds to the current version software,
the second version of the license agreement corresponds to an updated version software,
in a case where the second version of the license agreement that is linked to the current usage format of the monitoring apparatus is not newer than the first version, the determining determines that the user agreement to the second version of the license agreement is not necessary, and
in a case where the second version of the license agreement that is linked to the current usage format of the monitoring apparatus is newer than the first version, the determining determines that the user agreement to the second version of the license agreement is necessary; and
update the current version software, in a case where the user agreement to the second version of the license agreement is determined to be not necessary.

9. A non-transitory storage medium storing a control program for a monitoring apparatus that monitors a network device that is a management target of a device management service and executes software that operates in different operation modes according to a usage format, the control program being executable a computer to perform each step of a control method for the monitoring apparatus, the control method comprising:
determining whether or not a user agreement to a second version of a license agreement is necessary by comparing a first version and the second version of the license agreement that are linked to a current usage format of the monitoring apparatus, in a case where a current version software installed in the monitoring apparatus, which operates in the different operation modes according to the usage format, needs updating, wherein:
the first version of the license agreement corresponds to the current version software,
the second version of the license agreement corresponds to an updated version software,
in a case where the second version of the license agreement that is linked to the current usage format of the monitoring apparatus is not newer than the first version, the determining determines that the user agreement to the second version of the license agreement is not necessary, and
in a case where the second version of the license agreement that is linked to the current usage format of the monitoring apparatus is newer than the first version, the determining determines that the user agreement to the second version of the license agreement is necessary; and
update the current version software, in a case where the user agreement to the second version of the license agreement is determined to be not necessary.

* * * * *